US011088760B2

(12) United States Patent
Mazurowski

(10) Patent No.: US 11,088,760 B2
(45) Date of Patent: Aug. 10, 2021

(54) COUNTER DIRECTIONAL OPTICAL NETWORK USING RIBBON FIBER

(71) Applicant: The Penn State Research Foundation, University Park, PA (US)

(72) Inventor: John Mazurowski, Freeport, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 16/753,226

(22) PCT Filed: Oct. 5, 2018

(86) PCT No.: PCT/US2018/054591
§ 371 (c)(1),
(2) Date: Apr. 2, 2020

(87) PCT Pub. No.: WO2019/160584
PCT Pub. Date: Aug. 22, 2019

(65) Prior Publication Data
US 2020/0328813 A1 Oct. 15, 2020

Related U.S. Application Data

(60) Provisional application No. 62/568,471, filed on Oct. 5, 2017.

(51) Int. Cl.
*H04B 10/275* (2013.01)
*H04B 10/25* (2013.01)
(Continued)

(52) U.S. Cl.
CPC ......... *H04B 10/275* (2013.01); *G02B 6/3542* (2013.01); *H04B 10/25891* (2020.05);
(Continued)

(58) Field of Classification Search
CPC ............ H04B 10/275; H04B 10/25891; H04B 10/516; H04B 10/66; G02B 6/3542; H04Q 11/0062; H04Q 2011/0092
See application file for complete search history.

(56) References Cited

U.S. PATENT DOCUMENTS 4,553,233 A * 11/1985 Debuysscher ........ H04L 12/437
370/224
5,359,594 A * 10/1994 Gould ................... G06F 1/3215
370/276
(Continued)

OTHER PUBLICATIONS

International Search Report dated Sep. 13, 2019; International Application No. PCT/US2018/054591.

*Primary Examiner* — Mina M Shalaby
(74) *Attorney, Agent, or Firm* — Dinsmore & Shohl LLP

(57) ABSTRACT

A counter-directional optical network having multiple channels includes a source module connected with at least two network nodes by a fiber ribbon including an array of optical fibers. Each channel includes at least one optical fiber. The source module includes multiple signal sources, each signal source connected with one of the channels and operable to transmit a source signal in a direction in the channel. Each network node includes a modulator for processing the source signal with a data input signal forming a message signal, a switch for selecting one of the channels to transmit the message signal and a receiver connected with one of the channels for receiving a message signal from another node. The message signal is transmitted to the receiver of a receiving node in a direction opposite to the transmission direction of the source signal via the channel connected to the receiver of the receiving node.

20 Claims, 3 Drawing Sheets

(51) Int. Cl.
   *G02B 6/35*      (2006.01)
   *H04B 10/516*    (2013.01)
   *H04B 10/66*     (2013.01)
   *H04Q 11/00*     (2006.01)

(52) U.S. Cl.
   CPC ........... *H04B 10/516* (2013.01); *H04B 10/66* (2013.01); *H04Q 11/0062* (2013.01); *H04Q 2011/0092* (2013.01)

(56) References Cited

U.S. PATENT DOCUMENTS

| | | | |
|---|---|---|---|
| 5,777,762 A | | 7/1998 | Yamamoto |
| 5,930,016 A | * | 7/1999 | Brorson .................. H04J 14/02 398/1 |
| 2007/0242625 A1 | * | 10/2007 | Dunne ............... H04Q 11/0062 370/258 |
| 2008/0031623 A1 | * | 2/2008 | Bardalai ............. H04J 14/0241 398/57 |
| 2008/0124080 A1 | * | 5/2008 | Rabbat ................ H04J 14/0227 398/59 |
| 2009/0092389 A1 | * | 4/2009 | Wei ..................... H04J 14/0241 398/59 |
| 2010/0014806 A1 | * | 1/2010 | Lee ...................... G02B 6/4204 385/15 |
| 2010/0226245 A1 | * | 9/2010 | Ryoo .................. H04L 43/0811 370/225 |
| 2011/0063971 A1 | * | 3/2011 | Tochio .................. H04L 12/437 370/224 |
| 2011/0123195 A1 | * | 5/2011 | Frigo ................. H04Q 11/0067 398/59 |

* cited by examiner

COUNTER DIRECTIONAL OPTICAL NETWORK USING RIBBON FIBER

REFERENCE TO RELATED APPLICATION

This application is the U.S. National Stage of PCT/US2018/054591 filed Oct. 5, 2018, which claims priority to U.S. Provisional Patent Application Ser. No. 62/568,471, filed Oct. 5, 2017, the entire content of both are incorporated herein by reference.

GOVERNMENT SUPPORT

This invention was made with government support under Contract No. N00024-12-D-6404, Deliver Order No. 0379 awarded by the Naval Sea Systems Command (NAVSEA). The Government has certain rights in the invention.

FIELD OF THE INVENTION

The present invention relates to counter directional optical network using ribbon fibers used for transmitting and managing data.

BACKGROUND OF THE INVENTION

In fiber-optic communications, networks are being used to transmit and manage data. Efficiency can be increased if multiple optical carrier signals within one fiber can be separated in time, wavelength, space, frequency, or mode. This applies to fiber optic links.

In addition to size, weight, power, and cost, other metrics for networks are a) connectivity; that is having the ability quickly establish contact with multiple clients, b) flexibility; or how varieties of traffic types can be processed, and c) environmental compatibility; or the extent of environmental exposure that is allowed.

Additionally, a concern for networks where substantial traffic is aggregated is the damage risk from a single point failure.

SUMMARY OF THE INVENTION

The present invention provides a new network architecture using fiber ribbons. A fiber ribbon includes an array of optical fibers. Each fiber can carry a channel. In some embodiments, a channel may include a pair of fibers.

The network may include a source module and a plurality of network nodes. Each source module may include a plurality of sources. Each channel is associated with a specific source and a specific network node.

Each network node may include components such as a monitor, a modulator, a switch and a receiver. The node design for each channel differs by just one component, i.e., the receiver, which is connected to the channel/fiber associated with the specific node. Each monitor is associated with each channel for monitoring the presence and directions of the source signal and the message signal. A modulator processes the source signal, with a data input signal, forming a message signal. A switch selects one of the channels to transmit the message signal. A receiver is connected with one of the channels for receiving a message signal from another node.

Each channel/fiber in the ribbon is associated with at least one network node. The minimum number of the fibers in the ribbon is limited by the number of nodes in the network.

Independent optical sources for the network are located together in a common package or an array, where they are coupled to independent fibers within the ribbon. This reduces the cost of packaging, cooling and control, over packaging each source independently in network nodes.

All source signals propagate one way through the network over ribbon fibers. Each specific source and receiver occupies one fiber in the ribbon. Source signals travel around the network and can be interrupted by a switch or a receiver. Source signals traverse the network only once; this prevents interference. Specifically, the source signals travel around the network and, through the circulators in the source module, the source signals which are not interrupted are dissipated in the isolators (ISO). The presence of blocking isolators and circulators in the optical circuits are included to prevent interference. In some embodiments, multiple receivers occupy a single node.

The source signals may be un-modulated (Continuous Wave or CW) or pre-modulated.

A node transmits a signal or packet to another node by selecting the channel/fiber associated with the specific source and receiving node. The transmitting node monitors the source signal and modulates it. The modulator at the transmitting node modulates the source signal from the specific source with the data input signal thereby forming a message signal. This message signal meant for the receiving node travels in the opposite direction relative to the source signal. The presence of the message signal in the channel prohibits transmission of other data signal in the channel. Receiving a signal is a static function. A single receiver is always connected to its associated fiber within the ribbon. Therefore, the presence of a message signal in the associated fiber means that the message is meant for the specific receiver. To prevent interference, a node must completely absorb the message signal received, i.e., diverting the message signal to leave the network.

A pair of optical fibers in a channel can also be used to prevent interference. The source signal always travels on one fiber of the pair. After the source signal is modulated to form a message signal, the message signal can travel on the other fiber in the pair in the opposite direction to the receiving node.

The network topology can be implemented in multiple physical topologies. Any topology which allows transmission in both directions may be adapted to operate using the concept of the present invention.

Although channel-to-channel crosstalk can be adequately reduced within a single fiber using multiple optical carriers (separated in time, wavelength, space, or mode), using fiber ribbon assures adequate isolation between channels because each channel is carried in a separate fiber. Isolation to accommodate different classification levels could be accomplished by providing separate fibers or by providing separate channels within each fiber.

A concern for networks where substantial traffic is aggregated is the damage risk from a single point failure. Separating channels into separate fibers reduces this risk because disabling the entire signal path would only arise from damage to all of the fibers in a ribbon. The standard mitigation for risk caused by loss of an entire signal path is merely to provide redundant signal paths selected by a switch.

DETAILED DESCRIPTION OF THE DRAWINGS

Overview

Certain embodiments of the present invention provide an optical network for smaller platforms such as buildings, data Centers or airplanes.

The network incorporates a source module and a number of network nodes connected with optical fibers.

Optical fiber connections between network nodes are made using ribbon fibers. A ribbon fiber includes multiple fibers in an array. Using arrayed connectors, optical connections for all the ribbon fibers are made at one time, saving labor and materials over the use of separate connectors for each fiber.

Each network destination node corresponds to one fiber in the ribbon. The number of nodes equals the number of parallel optical fibers in the ribbon. The maximum number of nodes is limited by the number of fibers in the ribbon.

Independent laser sources for the network are located together in the same package leading to a fiber ribbon. This reduces the cost of packaging, cooling and control, over packaging each source independently.

All source signals propagate one way through the network over ribbon fibers. Each channel occupies one fiber in the ribbon. Source signals can be continuous or modulated in some way; for example with a clock signal.

Transmission of a signal to a specific node or receiver is accomplished by selecting the fiber corresponding to the specific node. Signals transmitted for a receiving node travel in the opposite direction relative to the source signals, but within the fiber corresponding to the receiving node.

A node intending to transmit to another node accesses the fiber associated with the receiving node through a switch, then a) modulates the source signal, and b) transmits the modulated signal in the reverse direction in the receiving fiber.

Network Architecture

The present invention provides a new approach with the network architecture incorporating a source module and nodes. The source module and the nodes are connected by fiber ribbons. The network topology can be implemented in multiple physical topologies. Any topology which allows transmission in both directions may be adapted to operate using the concept of the present invention.

Figure 1:
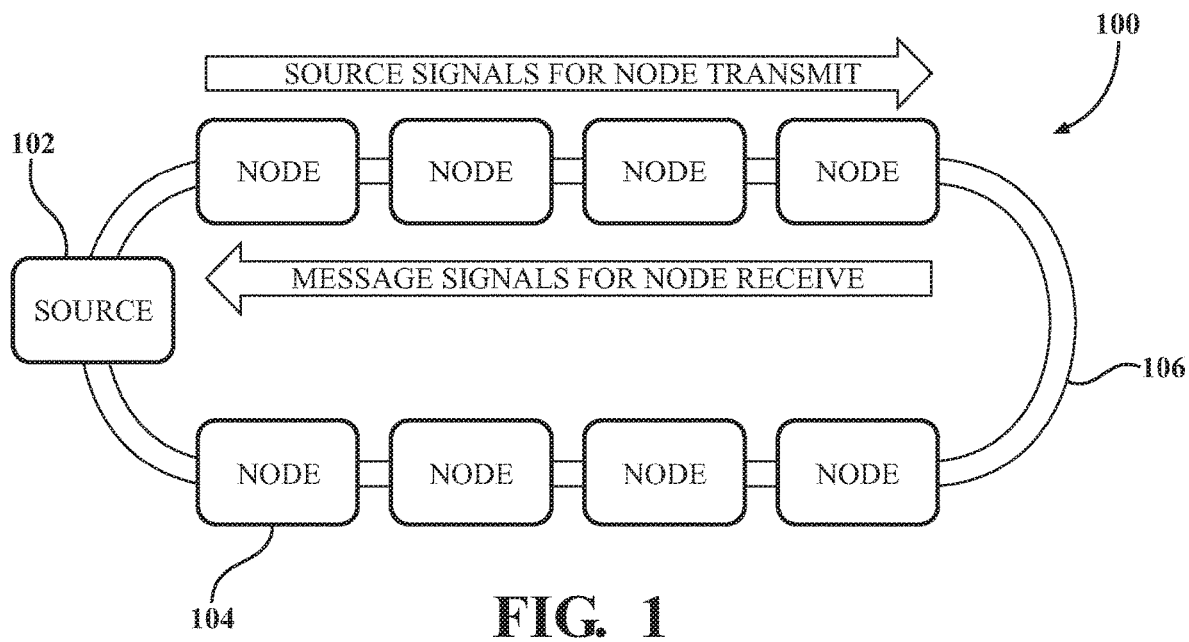
FIG. 1 is a schematic illustrating a ring-shaped network topology including a source module and eight nodes.

In an example illustrated by FIG. 1, the network is amenable to a ring architecture, where the source module 102 and a number of nodes 104 are connected by a fiber ribbon 106 in a ring.

When compared to components, optical fiber loss is near negligible. The limit on size of the network, then, is not necessarily the physical distance but the number of nodes in the network. For example, if a loss budget (power of source minus sensitivity of the receiver) is likely to be 20 dB and the loss through a node is 2 dB, 10 nodes can be accommodated in the network.

The minimum number of nodes in the network may be two. The ring functional topology can be fashioned in a ring or a buss physical topology type.

Figure 5:
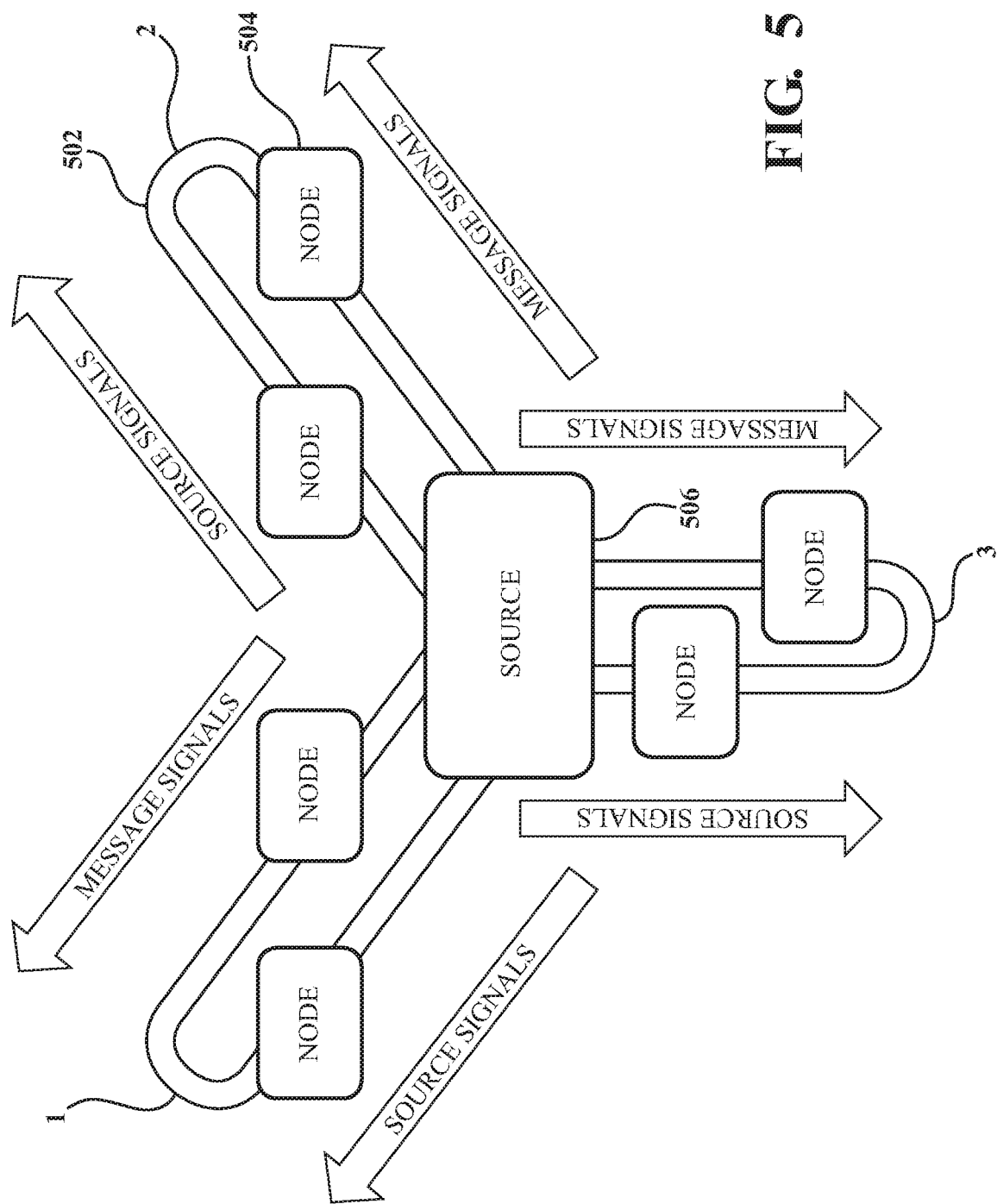
FIG. 5 is a schematic illustrating a star-shaped network topology including a source module and six nodes.

A star physical topology can be realized in two ways. One is by connecting the spokes of the star in consecutive buss physical topologies. The second is by locating the source module in the center of the star and dividing the source power among each spoke of the star, such as shown in FIG. 5. The star topology in FIG. 5 includes three sides 1, 2 and 3 with two nodes 504 on each side. The nodes 504 are connected by a fiber ribbon 502. The source module 506 is located in the center of the star. The source signal and message signal travel in opposite directions in the ribbon.

Physical Layer

The physical layer consists of a fiber ribbon. The fiber ribbon consists of an array of individual optical fibers, such as fibers 1 through N shown in FIG. 2 or 3. The individual fibers in the ribbon can be of any type that is compatible with the source, node switch, modulator, and receiving node detector. For consistent processing, all of the fibers in the ribbon should be compatible with the ribbonization process. A single common fiber type is preferred.

Source Module

Figure 2:
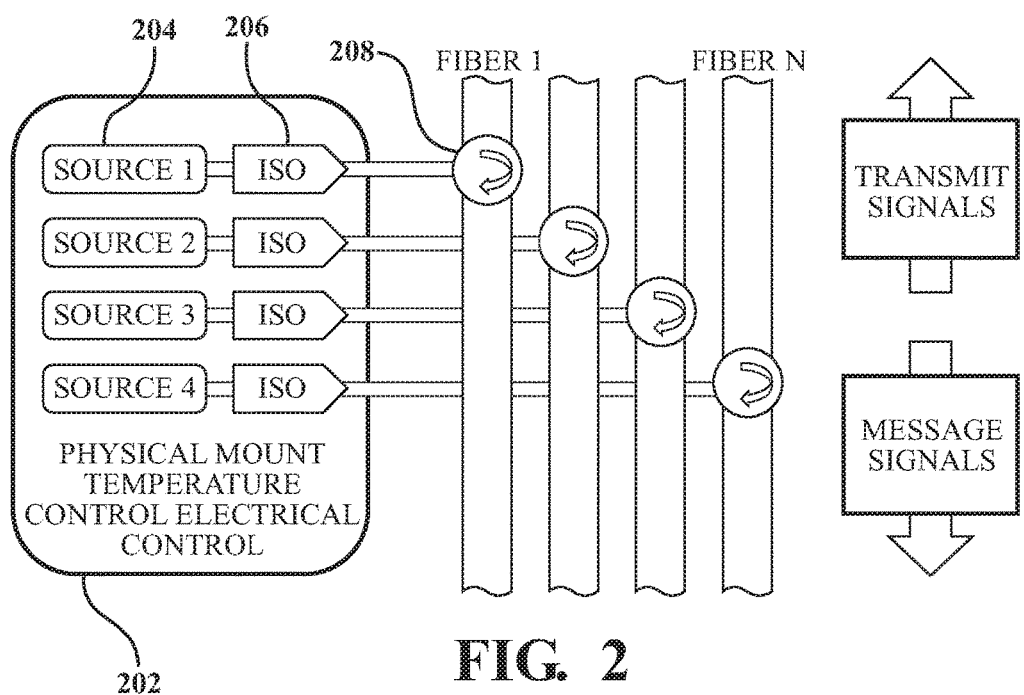
FIG. 2 is a schematic showing an example of a source module design using four lasers.

Using multiple fibers allows the signal sources to be agnostic of wavelength, so sources operating at the same wavelength or different wavelengths may be used. An illustration of a source module 202 in accordance with an embodiment of the present invention is shown in FIG. 2.

The source module 202 may include the source 204, the isolator 206 associated with each source, the circulator 208 associated with each source, and controls that can control the source signal. The source may be an LED, SLED, laser, etc. The controls may include cooling, temperature measurement/control, output power control, and fiber alignment. The lasers may be typical semiconductor lasers compatible with the fiber, and can emit the same or different wavelengths. Isolators (ISO) are optically connected to protect the sources such as lasers against exposure to reverse power. Circulators send the source optical signals in the correct direction in the fiber ribbon. Optical output signals are fed to circulators which properly guide the optical signals into the network, with source signals travelling one way and message signals travelling in the opposite direction. A circulator is a multi-port component in which a signal travels from an input port to the adjacent port in either the clockwise or counterclockwise direction; an arrow denotes which direction.

Each source is coupled to one fiber in the ribbon. All of the components and controls allocated to one source can be applied to all of the sources at once, or individually to single sources. Independent optical sources for the network are located together in a common package or an array. Packaging multiple sources together is a method of reducing cost over packaging the sources individually. In this embodiment, the sources are the only component that would require strict temperature control. The nodes may then be located in harsher environments, away from the sources.

All source signals propagate in one direction through the network over ribbon fibers. The signals sent to the network can be un-modulated (Continuous Wave or CW), modulated with clock, time-corrected for time sensitive systems, or use compound modulation schemes as preferred by the designer. Any combination of code, time, frequency, wavelength, or spatial modulation is allowed.

The source signals may be un-modulated (Continuous Wave or CW). Source signals can be pre-modulated to provide for example, synchronization or timing information (for example a clock), baseband impairment correction (for example pre-distortion), error correction (for example Forward Error Correction), optical impairment correction (for example chirping to increase spectral bandwidth).

The choice of unmodulated/modulated signals can be a single entity or can be aggregate, i.e. in time, in wavelength, in phase, in spatial, or in polarization multiplexed collections of signals. That is, multiple signals can travel within each fiber and each signal can be distinguished outside of the network. This is because the present invention where each source is coupled to one fiber in the ribbon is agnostic to modulation. Amplitude, phase, frequency, spatial, or any combination is conceivably allowed. Other than the fibers in the ribbon having the same outer diameter, enabling their formation into a ribbon, there is no restriction on the type, wavelength, or bandwidth of the source signal, as long as the signals are compatible with the type of fiber used.

The choice of modulated signal and modulator device can be specific to the destination node. The transmitter could adjust itself to the modulation that is compatible with the receiver to which it is transmitting. Each transmission path can differ by device or by fiber, dependent on its specific purpose. The choice of unmodulated/modulated signals and devices can be all identical or all different depending on the purpose of each signal path.

Compound modulation can be extended as well by reducing the extinction ratio of each switch to provide more room for compound modulation. Alternatively, different types of modulation methods can be used simultaneously, for example amplitude modulating a previously frequency modulated signal.

Node

Figure 3:
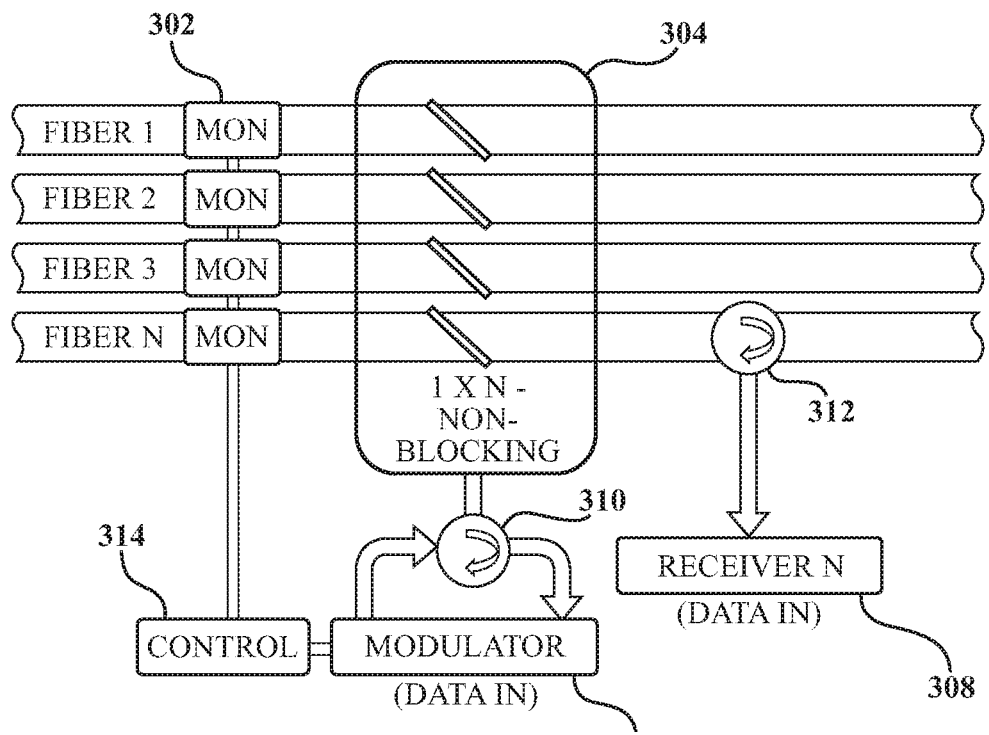
FIG. 3 is a schematic showing an example of a node design including four transmit and receive channels.

A node is attached to a location, client, or device that is intended to connect to the network to send and receive information via optical signals. An illustration of an individual node is shown in FIG. 3.

The node may include a monitor on each fiber, a switch for selecting a single fiber/channel, a modulator, a receiver for receiving a message signal, and circulators for directing various signals.

Monitors detect the source optical power in each fiber, indicating that a channel is ready for transmission. A monitor may consist of a coupler (perhaps 100:1 coupling ratio), a photodetector, and associated electronics. The coupler could be bi-directional (2×2) and monitor the signal in both directions within a fiber. The switch may be a 1×N non-blocking switch.

The node design for each channel differs from each of the others by only one component, i.e., the receiver. The difference is that the receiver is connected to the fiber that is associated with the specific node. Therefore, at each node, the receiver is connected to a different fiber.

In other words, each fiber is associated with at least one network node. The number of the fibers in the ribbon is at least the number of the network nodes in the network to ensure that there is a fiber in the ribbon for each node.

Nodes in the network of the present invention have two functions. i.e., the transmitting aspect and the receiving aspect.

Transmitting a signal to a specific node requires selection of the associated fiber in the ribbon, modulation of the source signal in the fiber, and sending the message signal down the associated fiber in the direction opposite to the source signal. The associated fiber is the fiber connected to the receiver at the destination node. At the transmitting node, a data signal came in waiting to be transmitted. The switch 304 at the transmitting node selects the channel/fiber associated with the receiver at the destination node. For example, the channel selected is Fiber N, meaning the data signal is to be sent to the node having the receiver on Fiber N. A source signal from the source N associate with Fiber N travels from left to right and will be redirected by the switch 304 along the downward arrow to the modulator 306. The switch 304 allows signals in all of the other fibers to pass through. The source signal redirected to the modulator will then be modulated by the data signal to generate a message signal. The modulation with the data signal must be independent of pre-modulation of source signal discussed herein above. The message signal will be sent by the modulator along the upward arrow back to the fiber N and travel from right to left towards the destination node. At the destination node, the receiver 312 will receive the message signal and the data signal may leave the network at the destination node. Presence of a modulated signal within a fiber means that the channel is being used so the transmission of any other data signal in that fiber is prohibited.

A single receiver 308, associated with Fiber N, is shown on the right. A circulator 312 guides the receiver signal into the optical receiver, while allowing all of the transmitted source signals to bypass.

The optical monitors shown for each channel can be used for network wide diagnostics, as the detected optical power would be dependent on the optical power reaching the node.

Possible options for this design may include a) an N×N non-blocking switch that allows multiple fibers to enter multiple modulators, and/or b) multiple receiver circuits in a single node, each associated with a single fiber.

Autonomy of a node to transmit to a peer node would eliminate the need for coordination of node transmissions. In some situations, indication to a node that it is permissible to transmit to a peer node within a fiber is given by a) presence of a source signal and b) absence of a message signal. This is true for all nodes except those that are between the source module and the receiving node. Here it is possible for a node to receive a source signal and no message signal, when in fact a message signal is being transmitted to a receiving node that is further from the source module.

The relationship between how frequent a node can send out messages and how far the node is from the source module can be managed by limiting the message length and requiring periods of idle time.

Outside coordination of node transmissions is required. This could be accomplished by a) pre-allotment of time slots for specific nodes, b) using the source module to send all-clear signals to individual nodes, or c) using secondary multiplexing or secondary modulation to stack node transmissions.

Coherence

Some source devices may produce signals that are coherent enough to interfere when traveling in opposite directions through this network. For example, ring lasers are produced using signals traveling in an optical fiber ring. Here the presence of blocking isolators and circulators in the optical circuits are included to prevent interference.

Figure 4:
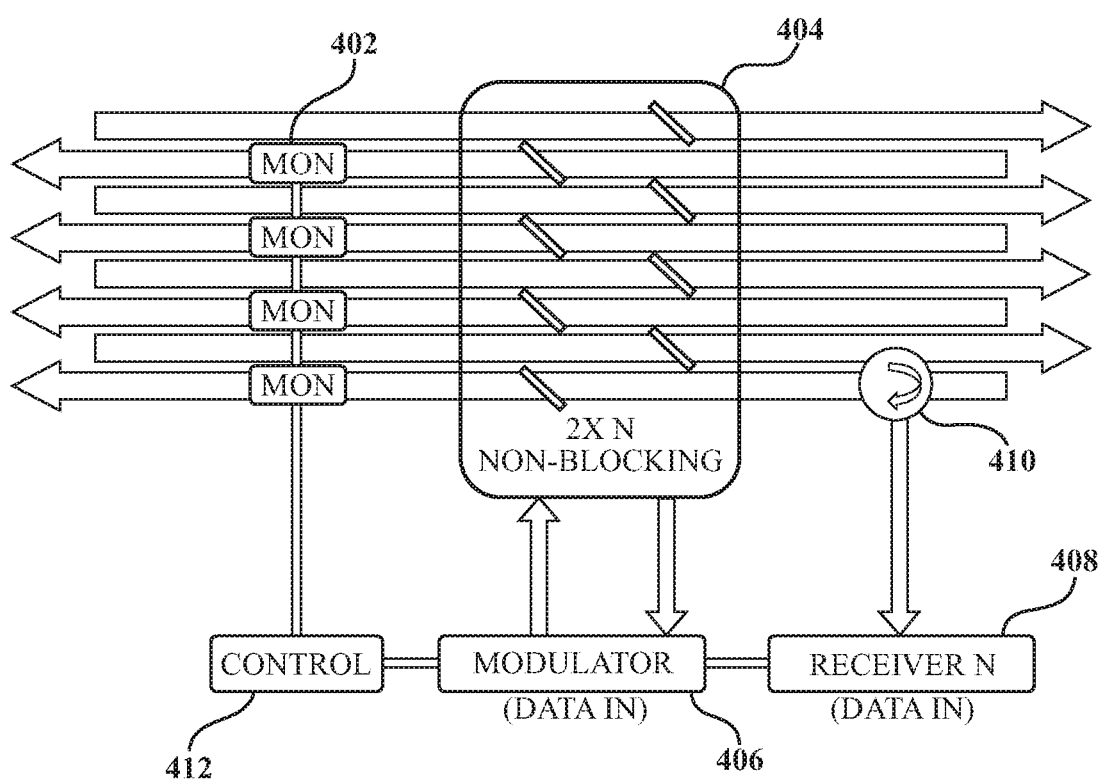
FIG. 4 is a schematic showing a network node alternative where coherent signals cause interference.

In the case where coherent signals would potentially cause interference, an alternate network design can alleviate issues caused by interaction between coherent signals. This is shown in FIG. 4 below. Here the source signals and the message signals are separated into distinct optical fiber pairs.

As will be clear to those of skill in the art, the embodiments of the present invention illustrated and discussed herein may be altered in various ways without departing from the scope or teaching of the present invention. Also, elements and aspects of one embodiment may be combined with elements and aspects of another embodiment. It is the following claims, including all equivalents, which define the scope of the invention.

The invention claimed is:

1. A counter-directional optical network, comprising:
   a fiber ribbon including multiple optical fibers in an array, the fiber ribbon including multiple channels, each channel including at least one of the optical fibers;
   a source module including multiple signal sources, each signal source coupled to one of the channels and operable to transmit a source signal in a transmission direction in the channel; and
   at least two network nodes, each node operable to act as a transmitting node to transmit a message signal to another of the nodes or to act as a receiving node to receive a message signal from another of the nodes, each node including:
      a receiver connected with one of the channels;
      a modulator for modulating the source signal in one of the channels to form the message signal; and
      a switch for selecting one of the channels to transmit the message signal;
      wherein the switch at the transmitting node selects the channel connected to the receiver at the receiving node to be a transmitting channel, the modulator at the transmitting node modulates the source signal from the signal source coupled to the transmitting channel with a data input signal at the transmitting node thereby forming the message signal, and the receiver at the receiving node receives the message signal;
   wherein the message signal is transmitted to the receiving node in the transmitting channel in a direction opposite to the transmission direction of the source signal in the transmitting channel.

2. The counter-directional optical network according to claim 1, wherein the number of the channels is at least the number of the nodes in the network.

3. The counter-directional optical network according to claim 1, wherein independent signal sources are located together in a common package or an array.

4. The counter-directional optical network according to claim 1, wherein all of the source signals propagate in the same direction and all of the message signals travel in the opposite direction.

5. The counter-directional optical network according to claim 1, wherein the source signal travels the network only once.

6. The counter-directional optical network according to claim 1, wherein each node further includes monitors, each monitor associated with each channel for monitoring the presence and directions of the source signal and the message signal, wherein the presence of the message signal in the channel prohibits transmission of another data signal in the channel.

7. The counter-directional optical network according to claim 1, wherein each node further includes circulators for directing the source signal and the message signal.

8. The counter-directional optical network according to claim 1, wherein the source signal is a continuous wave signal, a clock signal, a pre-modulated signal or a group of signals.

9. The counter-directional optical network according to claim 1, wherein the receiver at the receiving node completely absorbs the message signal.

10. The counter-directional optical network according to claim 1, wherein the source module further includes an isolator associated with each signal source, a circulator associated with each source and controls for controlling the source signal.

11. The counter-directional optical network according to claim 1, wherein each channel includes a pair of the optical fibers, the source signal and the message signal are transmitted separately on one fiber of the pair.

12. The counter-directional optical network according to claim 1, wherein the source module and the network nodes are connected to the fiber ribbon in a ring-shaped architecture.

13. The counter-directional optical network according to claim 1, wherein the source module and the network nodes are connected to the fiber ribbon in a star-shaped architecture with the source module being located in the center of the star.

14. A method of transmitting information using a counter-directional optical network, the method comprising the steps of:
   providing a counter-directional optical network having multiple channels and including a source module and at least two network nodes connected by a fiber ribbon, the fiber ribbon including multiple optical fibers in an array, each channel including at least one optical fiber, the source module including multiple signal sources, each signal source coupled to one of the channels and operable to transmit a source signal in a transmission direction in the channel, each node operable to act as a transmitting node to transmit a message signal to another of the nodes or to act as a receiving node to receive a message signal from another of the nodes, each node including a switch, a modulator and a receiver, the receiver associated with one of the channels;
   selecting, by the switch at the transmitting node, the channel associated with the receiver at the receiving node to be a transmitting channel;
   modulating, by the modulator at the transmitting node, the source signal from the signal source coupled to the transmitting channel with a data signal at the transmitting node to form a message signal;
   transmitting the message signal down the transmitting channel in the direction opposite to the transmission direction of the source signal in the transmitting channel; and
   receiving the message signal by the receiver at the receiving node.

15. The method according to claim 14, wherein multiple receivers occupy a single node.

16. The method according to claim 14, wherein presence of the message signal in a channel prohibits transmission of other data signal in the channel.

17. The method according to claim 14, wherein all of the source signals travel in the same direction and all of the message signals travel in the opposite direction.

18. The method according to claim 14, wherein each source signal travels the network only once.

19. The method according to claim 14, wherein independent signal sources are located together in a common package or an array.

20. The method according to claim 14, wherein each channel includes a pair of the optical fibers, the source signal and the message signal are transmitted separately on one fiber of the pair.

* * * * *